(12) United States Patent  
Woollenweber et al.

(10) Patent No.: US 9,353,876 B2
(45) Date of Patent: May 31, 2016

(54) BOOST PRESSURE CONTROL SYSTEM FOR TURBOCHARGED INTERNAL COMBUSTION ENGINES

(76) Inventors: William E. Woollenweber, Carlsbad, CA (US); Joseph S. Delgado, San Dimas, CA (US)

(*) Notice: Subject to any disclaimer, the term of this patent is extended or adjusted under 35 U.S.C. 154(b) by 199 days.

(21) Appl. No.: 13/385,967

(22) Filed: Mar. 19, 2012

(65) Prior Publication Data

US 2013/0239570 A1 Sep. 19, 2013

(51) Int. Cl.
| F02B 33/44 | (2006.01) |
| F16K 31/14 | (2006.01) |
| F16K 15/06 | (2006.01) |
| F16K 31/122 | (2006.01) |
| F02B 37/16 | (2006.01) |
| F02B 39/00 | (2006.01) |
| F16K 17/06 | (2006.01) |

(52) U.S. Cl.
CPC ............. *F16K 15/063* (2013.01); *F02B 37/16* (2013.01); *F02B 39/005* (2013.01); *F16K 17/06* (2013.01); *F16K 31/1223* (2013.01); *Y02T 10/144* (2013.01)

(58) Field of Classification Search
CPC ... F16K 17/06; F16K 31/1223; F16K 15/063; F02B 37/16; F02B 39/005; Y02T 10/144

USPC ........... 60/605.3, 611, 605.1; 123/564; 137/542, 543, 543.13, 495
See application file for complete search history.

(56) References Cited

U.S. PATENT DOCUMENTS

| 4,100,933 | A  | * | 7/1978  | Davey et al. ............... 137/495 |
| 6,067,946 | A  | * | 5/2000  | Bunker et al. ............. 123/90.12 |
| 6,516,828 | B2 | * | 2/2003  | Choate et al. .............. 137/469 |
| 6,668,853 | B2 | * | 12/2003 | Dean ...................... 137/315.04 |
| 6,923,205 | B2 | * | 8/2005  | Callies ...................... 137/495 |
| 6,976,359 | B2 | * | 12/2005 | Hastings et al. ............ 60/602 |
| 7,530,230 | B2 | * | 5/2009  | Shibui et al. ............... 60/608 |
| 2006/0248887 | A1 | * | 11/2006 | Arnold ..................... 60/599 |
| 2010/0032601 | A1 | * | 2/2010  | Kim et al. ............... 251/129.15 |

* cited by examiner

*Primary Examiner* — Thai Ba Trieu
*Assistant Examiner* — Wesley Harris
(74) *Attorney, Agent, or Firm* — Donn K. Harms

(57) ABSTRACT

A variable boost pressure control system for turbocharged internal engine systems comprising an adjustable charge air vent valve connectable with the charge air input to an internal combustion engine to provide selection and adjustment of the charge air pressure to the internal combustion engine, either at the site of the charge air vent valve or at a location remote from the charge air vent valve and to provide, if desirable, a flow of cool charge air to a turbocharger cooling jacket.

11 Claims, 4 Drawing Sheets

BOOST PRESSURE CONTROL SYSTEM FOR TURBOCHARGED INTERNAL COMBUSTION ENGINES

FIELD OF THE INVENTION

This invention relates to turbocharged internal combustion engines that use waste gates as a means of limiting boost pressure (charge air pressure) over the high engine speed range of operation.

BACKGROUND OF THE INVENTION

Turbochargers that are used on both diesel and gasoline engines to increase power output and reduce fuel consumption are becoming more and more prevalent in the marketplace since they also contribute to lowering exhaust emissions. They will be a significant factor in meeting the federally mandated mileage and emission standards that must be met by 2016.

Engines that are required to produce high power and high torque at low engine speeds, diesel truck engines for example, or passenger car engines that need to accelerate rapidly, require turbochargers that are capable of supplying high charge air pressure at low engine speeds, up to the torque peak speed of the engine. Above the torque peak speed, turbochargers with waste gates have been employed to prevent the turbocharger from exceeding its speed limit, and to maintain the charge air pressure constant over the high engine speed range. Turbochargers with waste gates are in common use today to bypass exhaust gas around the turbocharger turbine wheel to limit the speed of the turbocharger rotor and hold the boost pressure constant.

A predetermined maximum boost pressure generated by the turbocharger compressor is used to open the waste gate valve that is usually built into the hot turbocharger turbine casing. The waste gate valve and its operating mechanism represent a significant cost addition to the turbocharger.

Some turbochargers used on gasoline engines are subjected to higher exhaust gas temperatures than those used on diesel engines and require a cooling jacket in the bearing housing to protect their internal components from excessive heat. Currently, the cooling medium is engine coolant that must be piped from the engine to the turbocharger at its location within the engine enclosure and returned to the engine cooling system from the turbocharger cooling jacket.

Dr. William E. Woollenweber's patent application Ser. No. 12/803,618, titled "Air-Cooled Turbocharger with Optional Internal Pressure Relief Valve", discloses a turbocharger that uses compressed air from the engine air intake system to cool the turbocharger, thus eliminating the need for engine coolant and its accompanying piping to and from the turbocharger. One embodiment of the air cooling system uses a spring-loaded valve mounted downstream of an air-to-air aftercooler in the air intake system of the engine that limits the boost pressure to the engine to a predetermined value, and the air that is taken from the intake manifold is piped to the cooling jacket of the turbocharger to cool its internal parts. The use of a waste gate is thereby eliminated.

BRIEF SUMMARY OF THE INVENTION

In this invention, boost pressure to the engine is controlled at a selectable value by bleeding compressed air from the engine air intake system with a novel spring-loaded bleed valve located downstream of an air-to-air aftercooler.

The spring-loaded valve of this invention is made adjustable by either changing the spring tension by a fixed set screw, or by taking pressurized air from the turbocharger compressor and directing it through a modulating valve to the spring-loaded bleed valve. The modulating valve can be mounted in the driver compartment of a vehicle where the operator can vary the boost pressure to the engine to suit various driving conditions.

Bleeding air from the intake system requires the turbocharger to produce a higher quantity of compressed air, thus requiring more power to be generated by the turbocharger turbine. This additional turbine power is available over the high engine speed range through utilization of the excess energy that is present in the engine exhaust gas due to its high exhaust gas temperature.

The air that is bled from the engine intake manifold system has been cooled by passing through an air-to-air aftercooler where the cooling medium is ambient air. Thus, the compressed air to the engine is of the order of 100° F. to 140° F., depending on the ambient air temperature and the effectiveness of the aftercooler. This cooled air can be used effectively to cool the internal parts of a turbocharger.

The utilization of the novel adjustable bleed air valve in the engine air intake of this invention, downstream of an air-to-air aftercooler, is a unique method of preventing the turbocharger from exceeding its maximum speed limit and concurrently providing cooling air for the hot internal parts of a turbocharger. As previously stated, this invention eliminates the conventional waste gates and liquid coolant lines when liquid engine coolant is used to cool the hot internal parts of a turbocharger. Elimination of the waste gate results in a substantial cost saving since the adjustable boost pressure control valve is less complicated than a waste gate, has no connection with the hot exhaust parts of the turbocharger and can be made of less expensive materials than the exhaust gas by-pass valves or waste gates.

DETAILED DESCRIPTION OF THE INVENTION

As noted above, this invention discloses a boost pressure control system for a turbocharged engine which may, in a preferred embodiment, provide a selectable constant boost pressure over the high speed range of the engine or, in another embodiment, provide a variable boost pressure over the high speed range of the engine.

Figure 1:
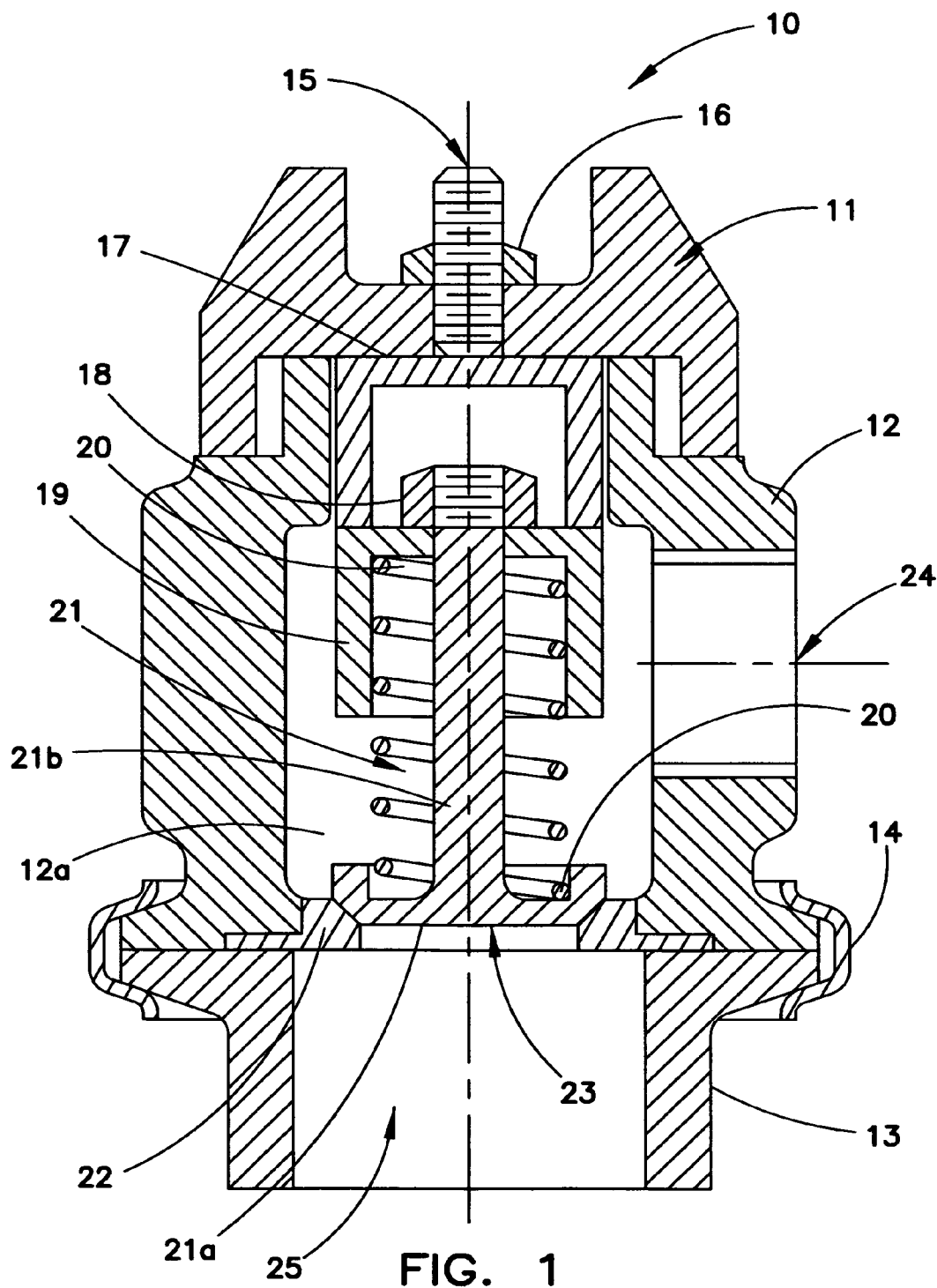
FIG. 1 is a cross-sectional view of one embodiment of an adjustable boost pressure control valve of the invention.

FIG. 1 illustrates an embodiment of the constant pressure control valve 10. The control valve 10 comprises a valve cap 11, and a valve body 12 that house a spring-loaded valve 21 seated against a valve seat 22. The valve 21 includes a valve closure portion 21a and a stem 21b projecting from the valve closure portion 21a, and a compression spring 20 surrounds and is carried by the valve 21. Spring 20 (coils not shown) is compressed to a fixed length by spring retainer 19 and nut 18. A piston 17 carried in a cylindrical portion 12a of the valve body 12, bears against spring retainer 19 and forces the spring retainer 19 to compress spring 20 to a fixed length and thus the force of the piston 17 to compress the spring 20 acts as a means for increasing the force imposed on the valve 21 by the spring 20 and can be increased by turning adjusting screw 15. Jam nut 16 locks the adjusting screw 15 in place. Once the piston 17 is positioned by the adjusting screw 15. a selected predetermined boost pressure in the engine intake manifold 8 (FIG. 4) will act against the valve face 23 and open the valve 21, allowing compressed air from the engine intake manifold 8 to escape through valve body 12 and out through opening 24. The compressed air escaping through opening 24 can be vented to the atmosphere or be piped to a turbocharger 9 (FIG. 4) cooling jacket to air-cool internal parts of the turbocharger.

Figure 2:
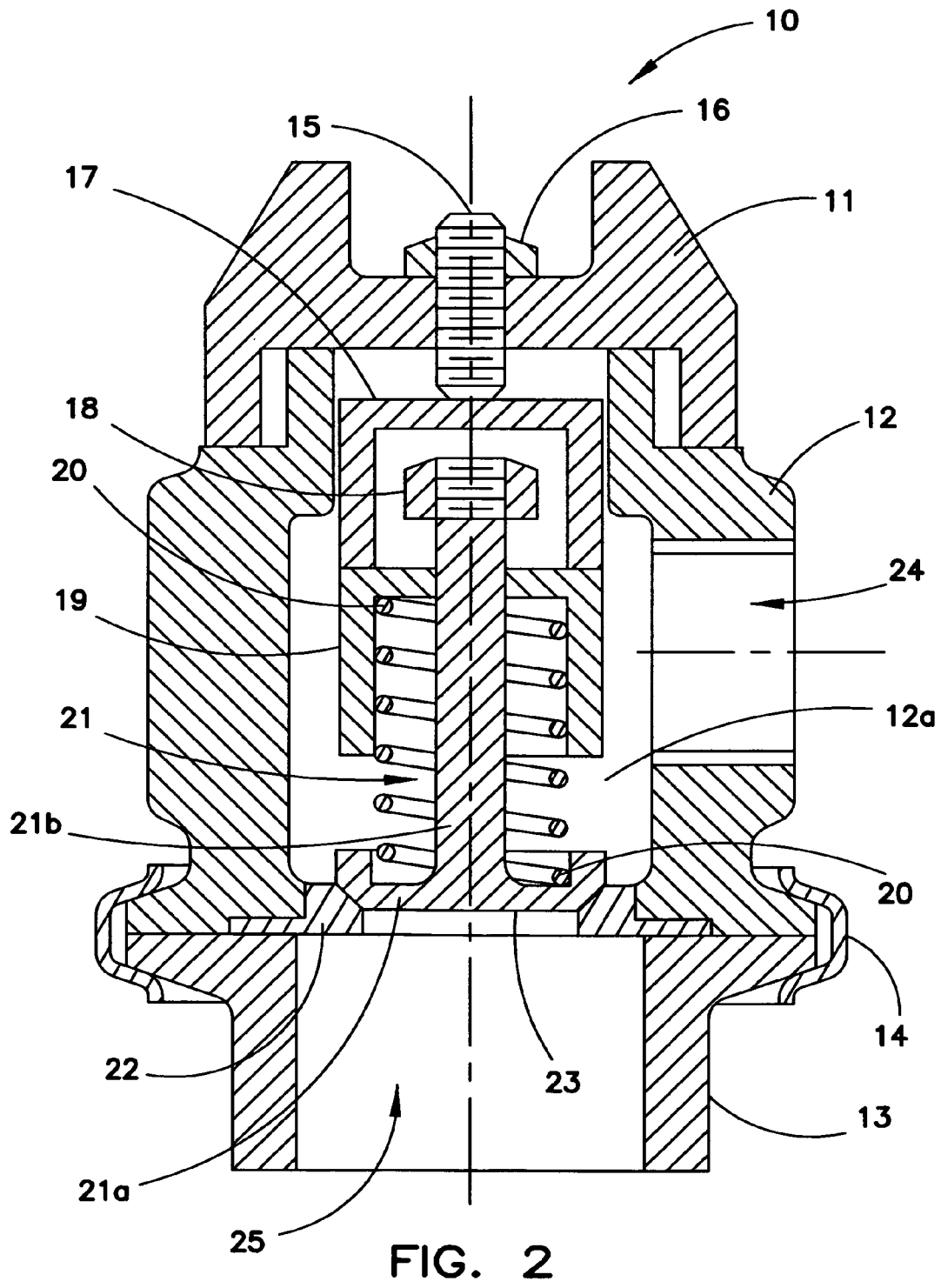
FIG. 2 is a cross-sectional view of an adjustable boost pressure control valve of FIG. 1 adjusted for a higher boost pressure level.

FIG. 2 illustrates the control valve 10 of FIG. 1, where the adjusting screw 15 has been locked in a position that has moved the piston 17 and spring retainer 19 to compress spring 20 to a shorter overall length. This shorter length of spring 20 increases the force applied to the valve closure portion 21a and requires a higher boost pressure from the intake manifold to move the valve closure portion 21a from the valve seat 22 and open the valve. Thus, in the configuration illustrated in FIG. 2, the engine will be supplied with a higher boost pressure than the valve configuration shown in FIG. 1.

Figure 3:
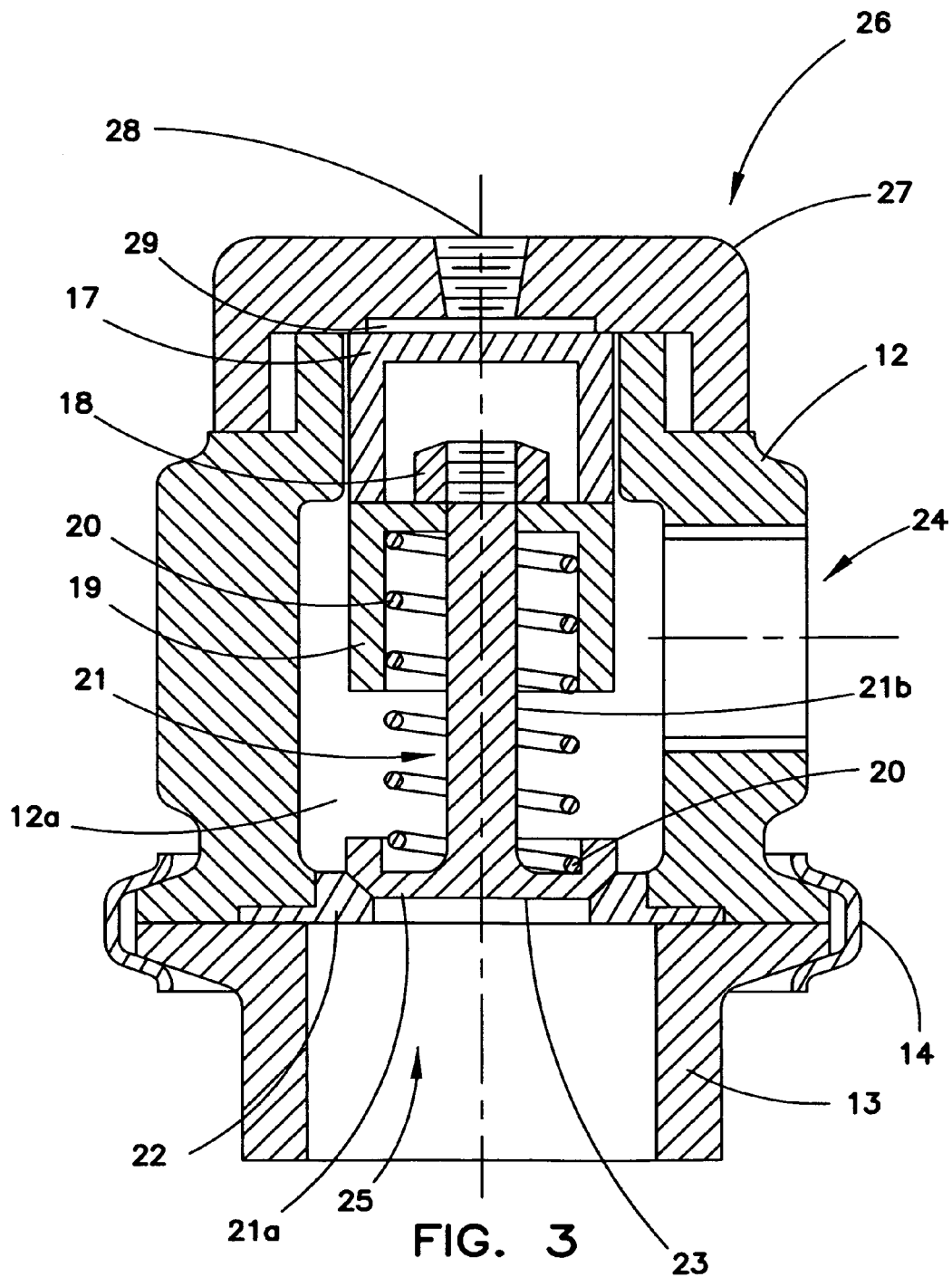
FIG. 3 is a cross-sectional view of another adjustable boost pressure control valve of the invention adapted for remote variation and control of boost pressure.

FIG. 3 illustrates a boost pressure control valve 26 with a valve cap 27 that has a pipe tap threaded opening 28 in its center for the purpose of admitting air pressure to the cavity 29 formed in the bottom surface of valve cap 27.

Figure 4:
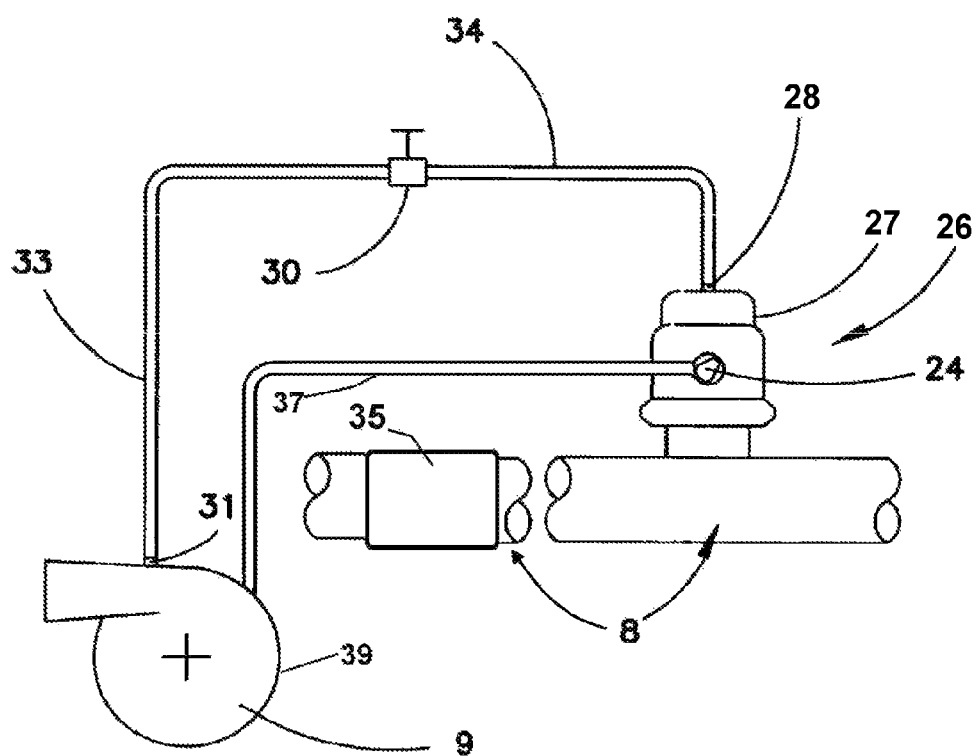
FIG. 4 illustrates a boost pressure control system of the invention, including an adjustable boost pressure control valve of FIG. 3, wherein air pressure from a turbocharger compressor casing is ducted through a modulating valve within a vehicle to the boost pressure control valve.

FIG. 4 illustrates the boost pressure control system where air pressure from the turbocharger compressor casing 9 is transmitted through a duct 33 to a modulating valve 30 and, after adjustment, if any, through a second duct 34 to the threaded opening 28 in the control valve cap 27. The modulating valve 30 can be remotely located, for example, in the cab of a vehicle where the vehicle operator can adjust the pressure in cavity 29 that acts on the top of the piston 17. The air pressure in cavity 29 acts to force the piston 17 to compress the spring 20 and acts as a means for increasing the force imposed on the valve 21 by the spring 20 like the adjusting screw 15, shown in FIGS. 1 and 2, by exerting a force on piston 17. This force can be varied by adjusting the modulating valve 30 between the air pressure lines 33 and 34. The boost pressure to the engine can be varied by a vehicle operator by using the modulating valve 30 to control the pressure in cavity 29. When the modulating valve 30 is closed, any pressure remaining in cavity 29 will bleed out through the clearance between the piston 17 and valve body 12.

The invention thus provides means for adjustably controlling the boost pressure of cylinder charge air from a turbocharger 9 to an internal combustion engine by providing a valve body 12, forming a closed chamber 12a with a charge air inlet 13 adapted for connection with a charge air duct between the turbocharger 9 and an internal combustion engine, such as the engine's intake manifold 8, and with a charge air outlet 24 connected with the surrounding environment. The valve body 12 carries a valve seat 22 around the charge air inlet 13 and a spring-loaded valve closure 21a for the valve seat 22. The spring-loading of the valve closure 21a holds the valve closure 21a against the valve seat 22 and is adjustable to vary the charge air pressure at which the valve closure 21a is moved from the valve seat 22 by the pressure of the charge air from the charge air duct (e.g., the intake manifold 8), acting on the valve closure 21a and permits charge air to escape from the charge air duct to the surrounding environment through opening 24.

As stated previously, current turbocharged engines employ an exhaust gas bypass valve (waste gate) in the turbocharger turbine casing to keep the turbocharger rotating assembly from exceeding its speed limit over the high engine speed range. The waste gate remains closed usually up to the torque peak speed of the engine, at which point the boost pressure provided by the turbocharger has reached a predetermined maximum value. Above the torque peak speed of the engine, the predetermined value of boost pressure opens the waste gate, thereby bypassing exhaust gas around the turbocharger turbine to hold the boost pressure to the engine constant over the high engine speed range.

The boost pressure control valve 10 of this invention accomplishes the same result as the waste gate by bleeding compressed air from the intake manifold system of the engine. Accordingly, the valve is mounted on the cool side of the engine and is not subjected to the hot exhaust gases of the engine, as are the waste gates.

As shown in FIGS. 1 and 2, the spring 20 is compressed to a predetermined length by the spring retainer 19 and nut 18 and exerts a predetermined force on valve 21. The sub-assembly, consisting of valve 21, spring 20, spring retainer 19 and nut 18, is held in place against the valve seat 22 by the piston 17 and adjusting screw 15.

In the embodiment shown in the figures, the valve base 13 can be fastened to the engine intake manifold downstream of an air-to-air after cooler by welding (or bolting) and admits the boost pressure existing in the engine intake manifold to exert a force against the valve face 23 of valve 21. When the boost pressure generated by the turbocharger compressor reaches a predetermined value, the force acting in valve seat 23 can overcome the spring force holding the valve closed, and open the valve. Pressurized air can then escape into the valve body 12 and exit through opening 24. As previously stated, the escaping air has been cooled by the after cooler 35 and can be piped via a conduit 37, to a turbocharger bearing housing 39 to cool internal components of the turbocharger 9. Alternately, the escaping air can be vented to the atmosphere if the turbocharger bearing housing does not have a cooling jacket 39 in its bearing housing.

Various springs 20 can be employed to offer a range of boost pressures and each individual spring has the ability to control boost pressure over a limited range of boost pressure. For example; a listing of springs and the boost pressure range for each follows:

| Spring | Boost Pressure Range |
| --- | --- |
| A | 15 to 21 psi |
| B | 21 to 28 psi |
| C | 27 to 35 psi |
| D | 34 to 42 psi |
| E | 44 to 54 psi |

The valve design can accommodate a number of different springs of the same wire diameter to offer boost pressure control over any range as required by commercial diesel and gasoline engines, or as desired by special vehicle operators.

We claim:

1. A valve for controlling the charge air pressure in an internal combustion engine system including a turbocharger, comprising:

a valve body including a central cavity and having a first opening at one end with a valve seat, said first opening adapted for a sealed engagement with a charge air duct communicating between the turbocharger and the internal combustion engine, said central cavity having a cylindrical portion at an end opposite the first opening, said central cavity further having a second opening from the central cavity communicating to an exterior of the valve body, a valve carried within the central cavity of the valve body, said valve having a valve closure for engaging the valve seat and closing the first opening and controlling a flow of charge air through said first opening communicated from said charge air duct in a said sealed engagement therewith, said valve further having a valve stem projecting from a first end engaged with the valve closure and extending into the central cavity to a distal end, a compression spring positioned on said valve stem and extending from a first end contacting a spring retainer engaged upon said valve stem adjacent said distal end, to a second end communicating against the valve closure, said central cavity further including a piston having a closed end, said piston carried in said cylindrical portion of the central cavity, said piston having a surface opposite said closed end seated against the spring retainer, said valve body further adjustably carrying a screw, said screw having an end extending into the cylindrical portion of the central cavity and engaging the closed end of the piston, said screw adjustable for moving the piston and thereby concurrent moving said spring retainer on the valve stem, in the direction of the valve closure, to thereby impart compression to the spring, and said compression applying a force from said spring to said valve closure in a direction of said valve seat, and, said force determining a pressure the charge air against the valve closure must exceed to move the valve closure from the valve seat and vent charge air from said charge air duct through the first and second openings of the valve body whereby an adjustment of said screw adjusts the said force applied to said valve closure which adjusts said pressure level of said charge air within said charge air duct.

2. The valve of claim 1 further comprising said second opening adapted for a connection to a duct in sealed communication with a cooling jacket of the turbocharger, whereby said duct carries the escaping charge air to said cooling jacket of the turbocharger to cool the turbocharger.

3. An apparatus for adjustably controlling the boost pressure of cylinder charge air from a turbocharger to an internal combustion engine, comprising:

a valve body forming a closed chamber with a charge air inlet adapted for a sealed engagement with a charge air duct communicating charge air under pressure between the turbocharger and the internal combustion engine, said valve body having a charge air outlet of said valve body communicating with said closed chamber and defining an exit pathway from said valve body, said valve body carrying a valve seat positioned between the charge air inlet and the charge air outlet, said valve seat formed around the charge air inlet a spring-loaded valve closure for the valve seat, said spring loaded closure biased by a spring loading force of a spring engaged around a valve stem, said spring extending between a spring retainer and said valve closure, said valve closure actuatable to separate from said valve seat by a force of said charge air pressure acting thereon exceeding said spring-loading force, said spring-loading force being adjustable to vary said charge air pressure within said charge air duct to a charge air pressure exerting said force acting on said valve closure, which is equal to or lower than said spring loading force acting on the valve closure, and said movement of said valve closure from said valve seat providing a pathway through said inlet for a communication of said charge from the charge air duct and through said valve body to an exit at said charge air outlet, wherein the valve body forms a cylinder portion with a piston movably carried within the cylinder portion of the valve body and connected with the spring, said valve body further forming an opening into the cylinder portion for the admission of a pressurized air into the cylinder portion;

said pressurized air communicated into said cylinder portion imparting a secondary force to act on and move the piston toward said retainer and thereby impose a said secondary force on the spring, said secondary force increasing said spring-loading force communicated to said valve closure and imparting a corresponding increase in the force of pressure of said charge air communicated from a engaged charge air duct which is required to move the valve closure from the valve seat.

4. The apparatus of claim 3 wherein said charge air outlet is adapted to engage a duct for the charge air escaping the valve body, connected between said charge air outlet of said valve body to a cooling air pathway of the turbocharger to thereby communicate said charge air to said cooling air pathway for cooling the internal parts of the turbocharger.

5. The apparatus of claim 3 wherein the opening into the cylinder portion of the valve body is connected to a duct leading to an outlet of a remotely located adjustable modulating valve, said adjustable modulating valve having an inlet in a communication with said charge air under said pressure from the turbocharger, an adjustment of the modulating valve permitting an increase in the pressure of said pressurized air and corresponding increase in said secondary force applied to the piston in the cylinder portion of the valve body and a corresponding in the force exerted by pressure of said charge air required to move the valve closure from engagement with the valve seat.

6. A valve for controlling the charge air pressure in an internal combustion engine system including a turbocharger, comprising:

a valve body including a central cavity and having a first opening at a first end having a valve seat surrounding said first opening within said central cavity;

said first end positioned in a sealed engagement of said first opening to a charge air duct which communicates charge air between the turbocharger and the internal combustion engine;

said central cavity having a cylindrical portion at a second end opposite the first opening;

a second opening communicating between said central cavity and an exterior of said valve body;

a valve carried within the central cavity of the valve body;

said valve having a valve closure for engaging the valve seat and closing the first opening and thereby controlling a flow of charge air from said charge air duct through said first opening, a compression spring engaged around a valve stem extending from said valve closure and extending between a spring retainer and the valve closure;

said compression spring imparting a force to said valve closure to maintain it in a contact with said valve seat;

said central cavity further including a piston having a closed end, said piston carried in said cylindrical portion of the central cavity, said piston having a surface opposite said closed end, said surface seated against the spring retainer;

an adjusting component for moving the piston and said spring retainer in a direction toward the valve closure, to thereby compress the spring and thereby communicate an increase of said force communicated from said spring to said valve closure in a direction of said valve seat; and whereby, said increase in said force communicated from said spring to said valve closure, increases a force of said pressure of the charge air communicated to the valve closure from said charge air duct which is required to move the valve closure from the valve seat, and thereby vent said charge air from said charge air duct through the first opening to an exit through the second opening of the valve body, to said exterior of said valve.

7. The valve of claim 6 wherein said adjusting component comprises:

said valve body further adjustably carrying a screw with one end extending into the cylindrical portion of the central cavity and engaging the closed end of the piston; and rotation of said screw in one direction moving said piston and imparting a corresponding movement of said spring retainer in said direction toward the valve closure.

8. The valve of claim 7 further comprising:

said second opening adapted for sealed engagement to a duct connected to a cooling jacket of said turbocharger; and said duct in said engagement with said second opening communicating said charge air vented from said charge air duct which exits said second opening, to said cooling jacket.

9. The valve of claim 6 wherein said adjusting component comprises:

an opening into the cylinder portion of the valve body;

said opening connected to a duct leading to an outlet of a remotely located adjustable modulating valve;

said adjustable modulating valve having an inlet in a communication with said charge air under said pressure from the turbocharger;

an adjustment of the modulating valve communicating said charge air under said pressure against the piston in the cylinder portion of the valve body thereby moving said piston and spring retainer in a direction toward the valve closure; and said movement of said piston resulting in a corresponding increase in said force of said spring against the valve closure and a corresponding increase in the force of said pressure of said charge air required to move the valve closure from engagement with the valve seat.

10. The valve of claim 9 further comprising:

said second opening adapted for sealed engagement to a duct connected to a cooling jacket of said turbocharger; and said duct in said engagement with said second opening communicating said charge air vented from said charge air duct which exits said second opening, to said cooling jacket.

11. The valve of claim 6 further comprising:

said second opening adapted for sealed engagement to a duct connected to a cooling jacket of said turbocharger; and said duct in said engagement with said second opening communicating said charge air vented from said charge air duct which exits said second opening, to said cooling jacket.

* * * * *